United States Patent [19]

Takahashi

[11] Patent Number: 4,486,815
[45] Date of Patent: Dec. 4, 1984

[54] SHUTTER DEVICE FOR CONTROL UNIT OF CONTROL CENTER

[75] Inventor: Masaru Takahashi, Gifu, Japan

[73] Assignee: Mitsubishi Denki Kabushiki Kaisha, Tokyo, Japan

[21] Appl. No.: 486,969

[22] Filed: Apr. 20, 1983

[30] Foreign Application Priority Data

Apr. 20, 1982 [JP] Japan ................. 57-65850

[51] Int. Cl.³ ............................................ H02B 1/14
[52] U.S. Cl. ..................................... 361/345; 361/339; 200/50 AA
[58] Field of Search ................ 200/50 AA; 361/337, 361/339, 343, 345, 390, 391

[56] References Cited

U.S. PATENT DOCUMENTS 4,038,585 7/1977 Wolski et al. ................. 361/334

FOREIGN PATENT DOCUMENTS 574806 9/1977 U.S.S.R. ................. 361/345
858157 8/1981 U.S.S.R. ................. 361/345

Primary Examiner—G. P. Tolin
Attorney, Agent, or Firm—Wenderoth, Lind & Ponack

[57] ABSTRACT

A shutter device is provided for each of a plurality of control unit removably accommodated in vertically superposed unit spaces of a control center. A plate-shaped protective barrier is disposed on the rear surface of each unit space and includes three rectangular openings. The shutter device includes a spring loaded shutter plate slidably disposed on the protective barrier and having two openings identical to those on the protective barrier at positions where the former openings normally alternate the latter openings. A cam is fixed to one end of the shutter plate to be directly driven by one of three protruding housings of a connector on the control unit as inserted into the associated unit space to move the shutter plate to its position where the openings on the latter are superposed on those on the protective barrier.

14 Claims, 5 Drawing Figures

SHUTTER DEVICE FOR CONTROL UNIT OF CONTROL CENTER

BACKGROUND OF THE INVENTION

This invention relates to control center for accommodating a multitude of plug-in type control units superposed on one another therein, and more particularly to a shutter device for each of those control units.

Control centers of the type referred to include the box member provided on the central portion with a set of vertical buses and a multitude of superposed control units removably accommodated on each of the front and rear sides of the vertical buses within the box member. Each of the control units is provided on the rear surface with a plurality of protruding connectors arranged to be connected in plug-in manner to associated one of the vertical buses when the control unit is inserted into the final accommodated position. Those control units can be drawn out from the box member for purposes of maintenance, inspection etc. At that time the vertical buses alive are prevented from being exposed by a protective barrier for covering the entire area of the vertical buses. The protective barrier is provided with a multitude of openings through which the associated protruding connectors extend one for each connector.

In order to improve the security, the control unit has been recently provided with a shutter device respective to the insertion and removed thereof into and from the box member to automatically open and close the above-mentioned openings.

One of conventional shutter devices has comprised a lever arm rotatably supported to a frame of a box member and a shutter plate slidably disposed on a protective barrier, for each control unit the arrangement being such that the lever arm can be rotated by one part of an associated control unit to interlock the shutter plate (see, for example, Japanese laid-open utility model application No. 170,808/1980).

In the conventional shutter device as described above positions of the protective barrier including the shutter plate, the frame of the box member having the lever arm supported thereto and the control unit driving the lever arm relative to one another might not be registered with one another due to errors in their assemblings. In addition, any control center has many chances of relacing one by another of control units whereupon the adjustment has been required.

Also, in order to permit the rotation of the lever arm reaching the associated shutter plate located within the vertical bus compartment, it has been required to dispose a through hole on a partitioning wall for the vertical bus compartment and further it has been necessary to form a spacing between the protective barrier and the partitioning wall thereby to cause the shutter plate interlocking with the lever arm to slide in the spacing. Thus the vertical buss compartment has not be good in air tightness. Also the shutter device has been required to be more inexpensive because the control center has a large number of the control units accommodated therein.

Accordingly it is an object of the present invention to eliminate the disadvantages of the prior art practice as described above by the provision of a shutter device for a control unit including a shutter plate arranged to be directly driven by a connector protruding beyond the rear surface of the control unit.

SUMMARY OF THE INVENTION

The present invention provides a shutter device for control unit of a control center comprising a box member, a set of vertical buses disposed on a central portion of the box member and at least one control unit including a protruding connector disposed on the rear surface thereof, and removably accommodated within said box member to be connected to the set of vertical buses in a plug-in manner, and a protective barrier for the control unit disposed in front of the set of vertical buses and including for example, three spaced openings through which three housing for the protruding connector can extend. The shutter device according to the present invention comprises a shutter plate including openings similar to those on the protective barrier and slidably disposed on the front surface of the protective barrier, a tensioning spring stretched between one end of the shutter plate and the protective barrier to tend to normally bias the shutter plate in a predetermined direction to close the openings on the protective barrier, and a cam fixed to the other end of the shutter plate to be located on the front surface thereof, and directly driven by the protruding connector following the insertion of the control unit into the box member, the arrangement being so that, when the cam engages the protruding connector, the shutter plate is moved to open the openings on the protective barrier while the cam is located within the control unit.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
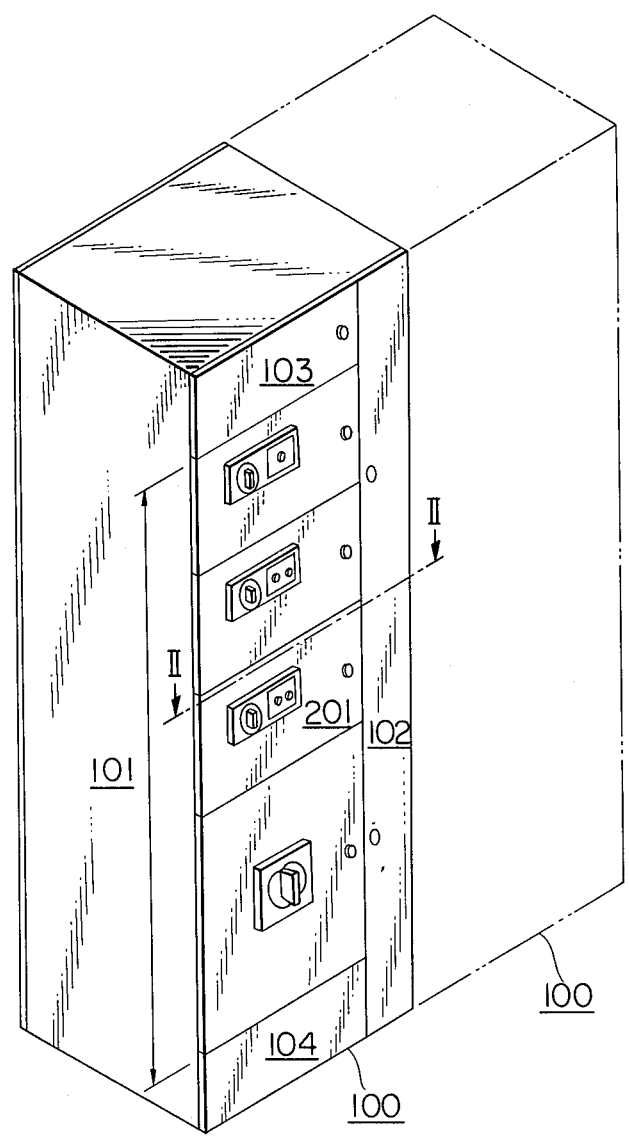
FIG. 1 is a perspective view of a control center embodying the present invention.

Referring now to the drawings there is illustrated a control center embodying the present invention. In FIG. 1 the control center 100 is shown as comprising a unit compartment 101, a longitudinal wire compartment 102 disposed on one lateral portion thereof in this case, a righthand lateral portion as viewed in FIG. 1 to extend through the height thereof and contact the unit compartment 101, a horizontal bus compartment 103 disposed on one end surface, in this case, the upper end surface as viewed in FIG. 1 of the unit compartment 101 and a cable treatment compartment 104 disposed on the other or lower end surface of the unit compartment 101. A plurality of control units as will be described later are arranged to be accommodated in superposed relationship within the unit compartment 101.

The control center 100 comprises the compartments as described above on the front portion thereof and compartments (not shown) identical thereto disposed in the same manner to the firstmentioned compartments on the rear portion thereof with a central spacing formed between the front and rear compartments to extend throughout the width of the control center.

Also a plurality of the control centers are arranged in a row to engage one another as shown typically by a broke block 100 in FIG. 1.

Figure 2:
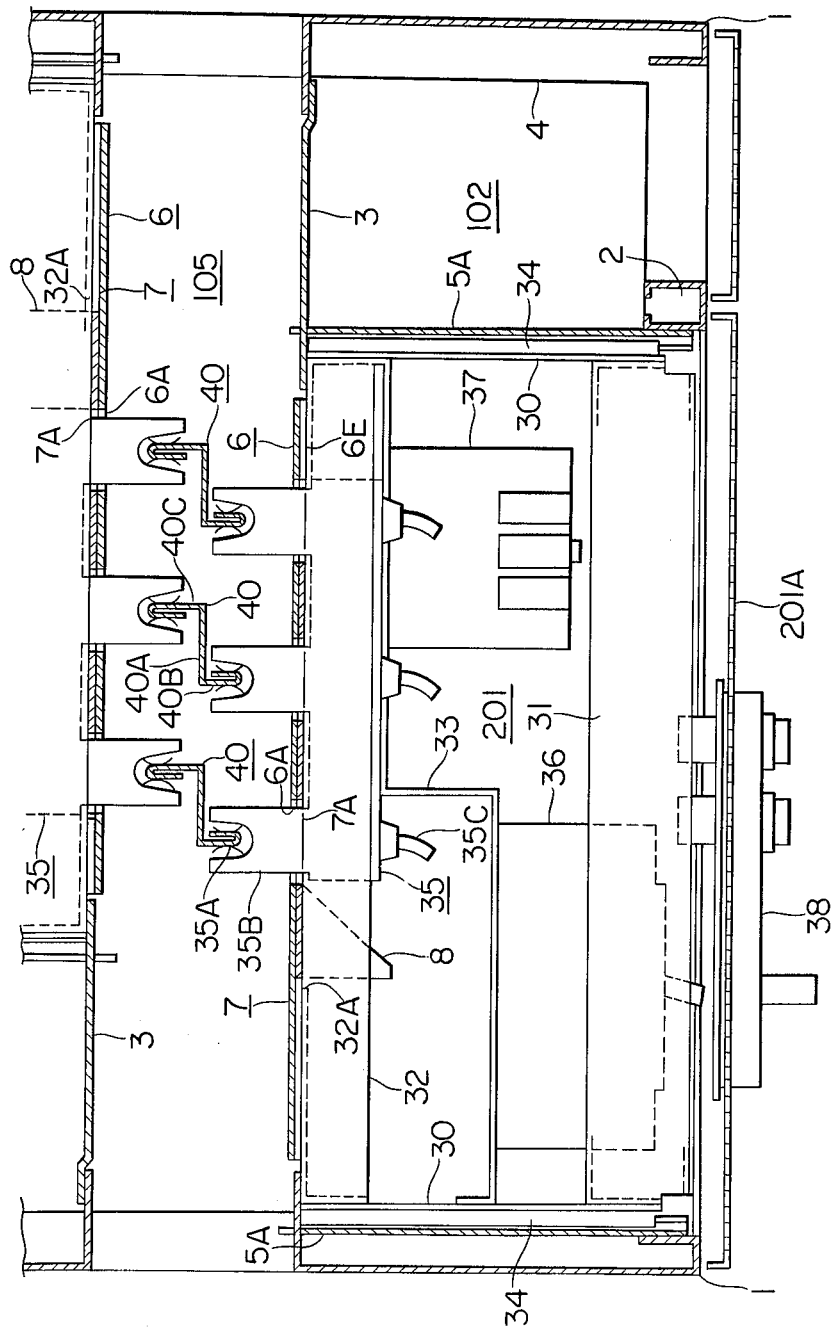
FIG. 2 is a horizontal sectional view as viewed on the line II—II of FIG. 1.

As shown in FIG. 2, a box member for the control center 100 includes a wall plate 1 disposed at each of four corners thereof and an intermediate support column 2 disposed between the unit compartment 101 and the longitudinal wire compartment 102 on each of the front and rear surfaces thereof. The wall plates 1 and the intermediate support columns 2 are connected at the upper and lower ends to horizontal frames 4 (see FIG. 4). As shown in FIG. 2, a pair of support plates 3 extend from the associated wall plates to physically isolate the longitudinal wire compartment 102 from a vertical bus compartment 105.

Figure 3:
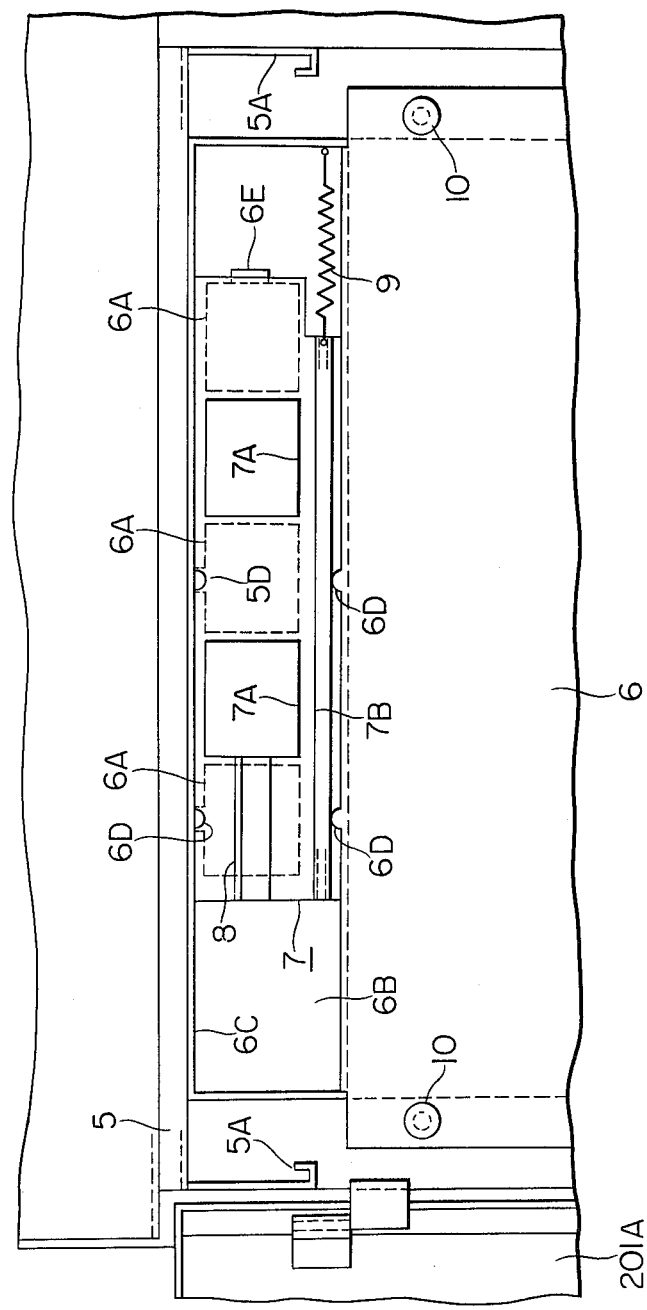
FIG. 3 is a front view of the control unit space shown in Figure with an associated control unit removed therefrom.
Figure 4:
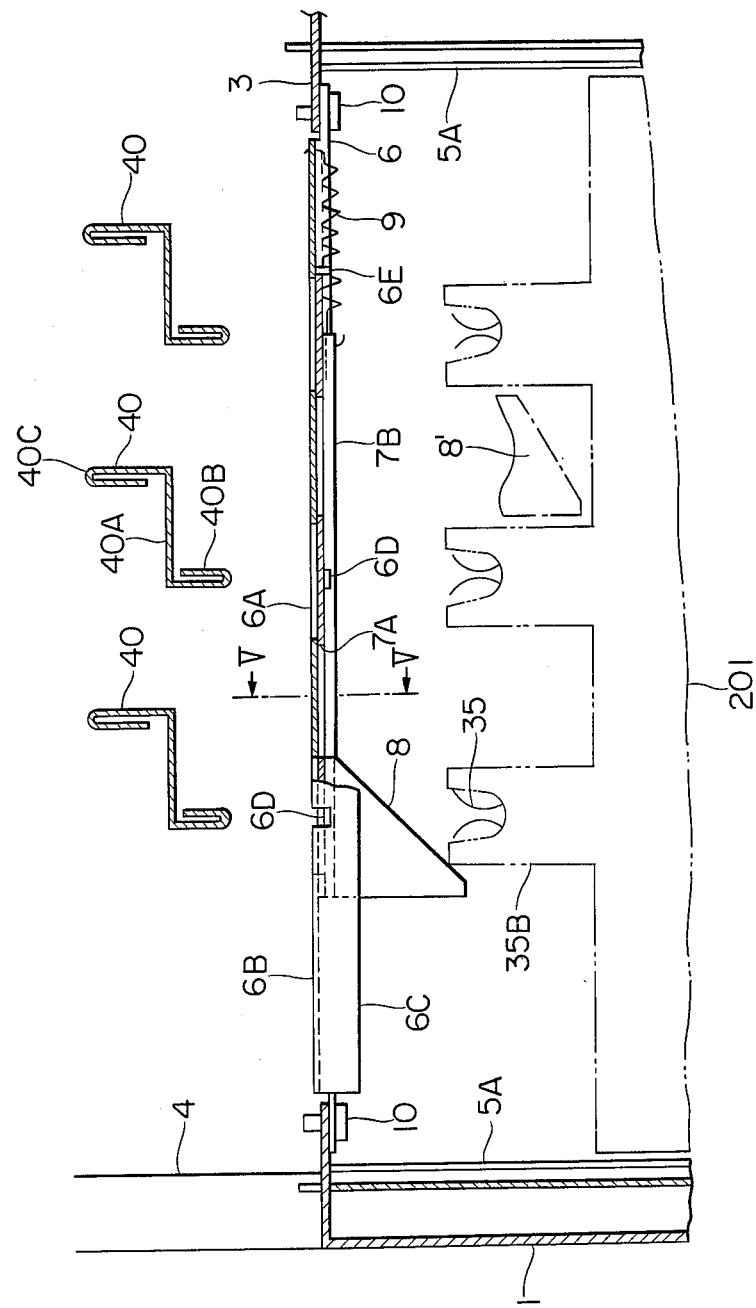
FIG. 4 is a horizontal sectional view of the essential part of the arrangement shown in FIG. 3.
Figure 5:
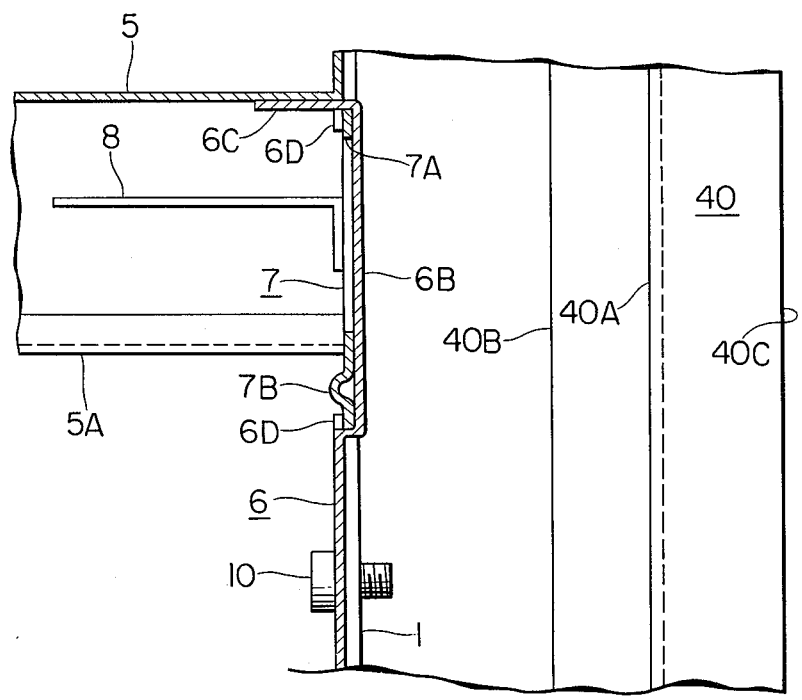
FIG. 5 is a vertical sectional view as viewed on the line V—V of FIG. 4.

The unit compartments 101 is divided into a plurality of unit spaces by a plurality of partitioning plates 5 (see FIGS. 3 and 5). The unit spaces are superposed on one another in a direction of the height of the control center 100 and a rear plate 6 is disposed on the innermost surface of each of the unit spaces to serve as a protective barrier for a plurality of vertical buses 40, vertically running at predetermined equal intervals within the vertical bus compartment 105. In the example illustrated the control center 100 is operatively associated with a three phase-three wire system and therefore the three vertical buses 40 are shown in FIGS. 2 and 4.

A multitude of control units such as shown typically by the reference numeral 201 in FIG. 2 are removably accommodated in the unit spaces respectively. Those control units are substantially identical in mechanical structure to one another although they may have different dimensions and include different electric components. Therefore only one of the control unit will be described.

As shown best in FIG. 2, the control unit includes a casing formed only of bilateral plate 30, a front cross member 31 connected at both ends to the front end portions of the bilateral plates 30 and a rear cross member 32 connected at both ends to the rear end portions of the bilateral plates 30. The front cross member 30 may be provided with a latch device (not shown) and also is used as a grip for drawing out the control unit 201 from the associated unit space. The rear cross member 32 is provided with a connector 35 including, in this case, three housings 35B of rectangular cross section extending at predetermined equal intervals through the rear plate 6 to protrude into the vertical bus compartment 105. Each of the housings includes a U-shaped contact 35A subsequently connected via a lead 35C to a distributing circuit breaker 36 disposed within the control unit 201 and mounted to a mounting plate 33 along with an electromagnetic switch 37. The mounting plate 33 is connected at both ends to the bilateral plates 30. Then an operating handle device 38 is disposed on the outside of a door 201A to externally operate the distributing circuit breaker 36. The door 201 forms the front surface of the control unit 201.

Also as shown in FIG. 3, each of the partitioning plates 5 has both end portions downward extending to terminate at respective J-shaped guide rails 5A. Then each of the guide rails 5A is slidably fitted onto an installing rail 34 disposed on the outer surfaces of each of the bilateral plates 30.

The three vertical buses are shown in FIG. 2 as being disposed at the predetermined equal intervals as described above within the vertical bus compartment 105 to be aligned with one another widthwise thereof. Each of the vertical buses 40 is formed into a Z-shaped cross section according to roll forming technique. More specifically, each of the vertical buses 40 includes an intermediate portions 40A parallel to the rear plate 6 and a front and a rear leg portions 40B and 40C respectively extending in opposite directions from both ends of the intermediate portion 40B to be perpendicular to the rear plate 6. When the control unit 201 is put at its final accommodated position within the associated unit space, the front leg portion 40B of each vertical bus 40 engage an associated one of the U-shaped contacts 35A on the control unit 201. The rear leg portion 30C similarly can engage an associated one of U-shaped contacts 35A on a control unit put at its final accommodate position within a unit space on the rear side of the control center to be opposite to the control unit 201. Then the vertical buses 40 are fixed to the wall plates 1 and others through electrical insulation means (not shown).

As shown in FIG. 5, the rear plate 6 serving as the protective barrier includes a recess 6B located on the upper portion thereof and having an upper end portion formed into an L-shaped bent portion 6C one leg of which engages the lower surface of the associated partitioning plate 5. The recess 6B has disposed therein a shutter plate 7 as will be described later. As shown in FIG. 3, the recess 6B includes thereon three openings 6A complementary in shape to the protruding housing 35B units disposed at predetermined equal intervals. The protruding housings 35B of the connector 35 can extend through associated ones of the openings 6B. One can peep the front or rear leg portions 40B or 40C of the vertical buses 40 through the openings 6A as the case may be. The recess 6B is also provided at the upper and lower edges as viewed in FIG. 3 with a plurality of pairs of opposite guide pawls 6D, in this case, two pairs of opposite pawls spaced from a flat bottom thereof by equal distances somewhat larger than a thikeness of the shutter plate 7. Thus the guide pawls 6D are slidably engaged by the shutter plate 7 movably disposed in the recess 6B as will be described later and serve to prevent the shutter plate 7 from disengaging from the recess 6B.

As shown in FIGS. 3, 4 and 5, shutter plate 7 has a reinforcing rib 7B formed adjacent a lower longitudinal edges thereof as viewed in FIG. 5 to extend in parallel thereto and throughout the length thereof. Then energizing means, for example, a tensioning spring 9 is stretched between the righthand end as viewed in FIG. 3 or 4 of the rib 7B and the righthand end as viewed also in FIG. 3 or 4 of the rear plate 6 to tend to normally bias the shutter plate 7 in a righthand direction as viewed in FIG. 3 or 4 until the shutter plate 7 is stopped by a stopper pawl 6E disposed at the righthand side of the rightmost rectangular opening 6A as viewed in FIG. 3 or 4 on the rear plate 6. At its stopped position illustrated the shutter plate 7 closes all the three openings 6A on the rear plate 6 while the rear plate 6 closes a pair of rectangular openings 7A identical in size to the openings 6A and sisposed at the same interval as the openings 6A on the shutter plate. In other words, the openings 6A alternate the openings 7B to block the vertical bus compartment 105 from each of the unit spaces in the absence of the control units.

A cam 8 of sheet steel in the form of rightangled triangle is fixed to that end portion of the shutter plate 7 remote from the tensioning spring 9 or the lefthand end portion as viewed in FIG. 4. To this end one of two sides of the triangle subtending a right angle is folded to the perpendicular to the plane of the triangle (see FIG. 5) and the folded end portion is fixed to the lefthand end portion of the shutter plate 7 at the same level as the connector housings 35B as by welding or screw clamping so that the side of the triangle perpendicular to the folded side is substantially flush with the lefthand end as viewed in FIG. 4. Thus the triangular cam 8 includes a base tilted to the spane of the shutter plate 7.

The shutter plate 7 with the cam 8 can be caused to previously slide between the recess 6B on the rear plate 6 and the guide pawls 6D from the left thereof as viewed in FIG. 4 after which the tensioning plate 9 is fixed to the shutter plate 7 as described above. This results in the shutter plate 7 being normally biased to a stopped position as determined by the stopper pawl 6E, as described above without disengaging from the rear plate 6. Then the rear plate 6 connected to the shutter device is fixed to the wall plate 1 and the support plate 3 through a screw 10.

As shown in FIG. 4, the cam 8 at the stopped position has the base of the triangle obliquely abutting against the extremity of the protruding housing 35 on the control unit partly inserted into the associated unit space by having the installing rails 34 sliding along the mating guide rails 5A. When the control unit is further inserted into the unit space, the cam is moved in the lefthand direction as viewed in FIG. 4 against the action of the tensioning spring 9. Accordingly the shutter plate 7 integral with the cam 8 is also moved in the lefthand direction until the extremity of the protruding housing 35B reaches the surface of the shutter plate 7. At that time, the openings 7A are superposed on the openings 6A. This permits the protruding housings 35A to extend through superposed openings 7A and 6A to reach the associated vertical buses 40 with the result that the U-shaped contacts 35A are connected to the respective vertical buses 40 in the plug-in manner. At that time the cam 8 is passed through a through hole 32A disposed on the rear cross member 32 and accommodated in the control unit 201 as shown in FIG. 2.

When the control unit 201 is drawn out from the unit space, the shutter plate 7 is instantaneously returned back to its stopped position by means of the action of the tensioning spring.

From the foregoing it is seen that, in the shutter device of the present invention the cam integral with the shutter plate is directly driven by the protruding housing on the connector extending through the superposed openings on the rear plate or protective barrier and the shutter plate. This measure eliminates errors in assembling with other compartments and therefore the adjustment therefor is not required. Furthermore with the control unit initially obliquely inserted into the associated unit space, the driving by the shutter plate is ensured by properly selecting the size of the cam by considering such oblique insertion. Also since the cam is located within the control unit, it is not required to dispose an opening on a wall plate or a supporting plate forming a wall of a vertical bus compartment to permit the interlocking with the shutter plate. Moreover because of the use of the rear plate for each unit space intimately contacted by the upper and lower partitioning plates and the bilateral plates of the box member, the vertical bus compartment is shielded without gaps scarcely formed between the same and the superposed unit spaces. Thus it is ensured that foreign matters are prevented from intruding into the vertical bus compartment. Also the shutter device is formed only of two compartments or the shutter plate and the cam resulting in a simple structure without a screw clamp. Thus the shutter device is very cheap. In addition, the cam is accommodated in the control unit beside of the connector when the control unit is put in its finally inserted or accommodated position. Thus the control unit has a space factor scarcely reduced. For a large distance between each pair of protruding housings, the cam may be accommodated between the base portions of the adjacent housings (see, broken line 8', FIG. 8). This measure permits the cam to be quite prevented from interferring with the components disposed within the control unit.

While the present invention has been illustrated and described in conjunction with a single preferred embodiment thereof it is to be understood that numerous changes and modification may be resorted to without departing from the spirit and scope of the present invention. For example, the present invention has been illustrated and described in conjunction with a control unit used with a three phase-three wire system but it is to be understood that the present invention may be equally applicable to a control unit used with a three phase-four wire system. In the latter case the shutter plate increases in width to increase the number of the openings 7A by one.

Also the present invention is equally applicable to conventional resinous protective barriers for covering the entire lengths of the vertical buses in a sandwiched manner. In addition the shutter plate and the cam can be formed into a unitary structure of a resinous material.

What is claimed is:

1. A shutter device for a control unit of a control center comprising a box member, a set of vertical buses disposed on a central portion of said box member, at least one control unit including a protruding connector disposed on a rear surface thereof, and removably accommodated within said box member to be connected to said set of vertical buses in a plug-in manner, and protective barrier means disposed in front of said set of vertical buses, and including opening means through which said protruding connector can extend, said shutter device comprising a shutter plate including opening means corresponding in size to said opening means on said protective barrier means, said shutter plate being slidably disposed on a front surface of said protective barrier means to cause said two opening means to oppose to each other, energizing means disposed on said shutter plate to normally impart to said shutter plate a force of motion in a predetermined direction to close said opening means on said protective barrier means, and a cam disposed on a front surface of said shutter plate, and directly driven by an extremity of said protruding connector following the insertion of said control unit within said box member, the engagement of said cam with said protruding connector causing said shutter plate to be moved to open said opening means on said protective barrier.

2. A shutter device for a control unit of a control center as claimed in claim 1 wherein the interior of said control center is divided into a plurality of control unit spaces by a plurality of partitioning plates, said protective barrier means including a plurality of protective barriers one for each of said control unit spaces, and shutter plate is slidably engaged by and prevented from disengaging from an associated one of said protective barriers.

3. A shutter device for a control unit of a control center as claimed in claim 2 wherein said protective barrier is provided on a portion including said opening means with a recess having a size sufficient to slidably receive said shutter plate therein.

4. A shutter device for a control unit of a control center as claimed in claim 3 wherein said recess is provided at a pair of opposite longitudinal edges with a plurality of pairs of opposite guide pawls spaced from a flat bottom of said recess by equal distance somewhat larger than a thickness of said shutter plate.

5. A shutter device for a control unit of a control center as claimed in claim 2 wherein each of said protective barriers includes plurality of openings disposed at predetermined equal intervals, and the outermost one of said openings is provided the outermost end thereof with a stopper pawl for controlling the movement of said shutter plate.

6. A shutter device for a control unit of a control center as claimed in claim 1 wherein said energizing means comprises a tensioning spring stretched between a selected one of both ends of said shutter device and an adjacent end of the associated protective barrier means, said tensioning spring normally imparting to said shutter plate a moving force so as to close said openings on said protective barrier means.

7. A shutter device for a control unit of a control center as claimed in claim 6 wherein said shutter plate includes a reinforcing rib extending along one longitudinal side and said tensioning spring is fixed at one end to said reinforcing rib.

8. A shutter device for a control unit of a control center as claimed in claim 1 wherein said cam is accommodated within said control unit to be located therein when said control unit is put in the finally inserted position.

9. A shutter device for a control unit of a control center as claimed in claim 8 wherein said cam is accommodated in said control unit to be located beside said protruding connector disposed at the rear end of said control unit.

10. A shutter device for a control unit of a control center as claimed in claim 8 wherein said cam is disposed on one end portion of said shutter plate.

11. A shutter device for a control unit of a control center as claimed in claim 10 wherein said cam includes a tilted side for moving said shutter plate against the action of said energizing means by engaging said cam with said protruding connector.

12. A shutter device for a control unit of a control center as claimed in claim 10 wherein said cam is fixed to said shutter device at the same level as said protruding connector.

13. A shutter device for a control unit of a control center as claimed in claim 9 wherein said protruding connector includes a plurality of protruding housings and said cam is fixed to said shutter plate so as to be located between a pair of adjacent housings at rear ends thereof.

14. A shutter device for a control unit of a control center as claimed in claim 2 wherein said protective barrier means also serves as a blocking plate for blocking the rear surface of the said control unit space.

* * * * *